United States Patent [19]

Schulte et al.

[11] Patent Number: 4,831,217
[45] Date of Patent: May 16, 1989

[54] HOLDING OF CONDUCTORS

[75] Inventors: Uwe Schulte, Wetter; Heinz Pfannkuche, Bochum, both of Fed. Rep. of Germany

[73] Assignee: Mannesmann AG, Duesseldorf, Fed. Rep. of Germany

[21] Appl. No.: 12,870

[22] Filed: Feb. 10, 1987

[51] Int. Cl.⁴ .............................................. B60M 1/34
[52] U.S. Cl. ........................................ 191/32; 191/40
[58] Field of Search ..................... 191/22 R, 29 R, 32, 191/33 R, 40

[56] References Cited

U.S. PATENT DOCUMENTS

| | | | |
|---|---|---|---|
| 3,995,725 | 12/1976 | Howell, Jr. | 191/40 X |
| 4,022,967 | 5/1977 | Bulanchuk | 191/40 X |
| 4,109,768 | 8/1978 | Fromme et al. | 191/22 R |
| 4,255,838 | 3/1981 | Obst et al. | 191/32 X |
| 4,393,785 | 7/1983 | Hortnagel | 191/32 X |

OTHER PUBLICATIONS

Montageanleitung Einzelleiter Del-DSB, Undated.

Primary Examiner—Dennis H. Pedder
Attorney, Agent, or Firm—Ralf H. Siegemund

[57] ABSTRACT

A holder for conductors on a rail has multiple claw pairs arranged in staggered and laterally offset relation, for minimizing the space requirement. Claws for holding adjacent conductors are aligned but separated for individual resilient deflection; several fasteners for the holder on the rail are disclosed, all providing for snap action kind of insertion.

4 Claims, 1 Drawing Sheet

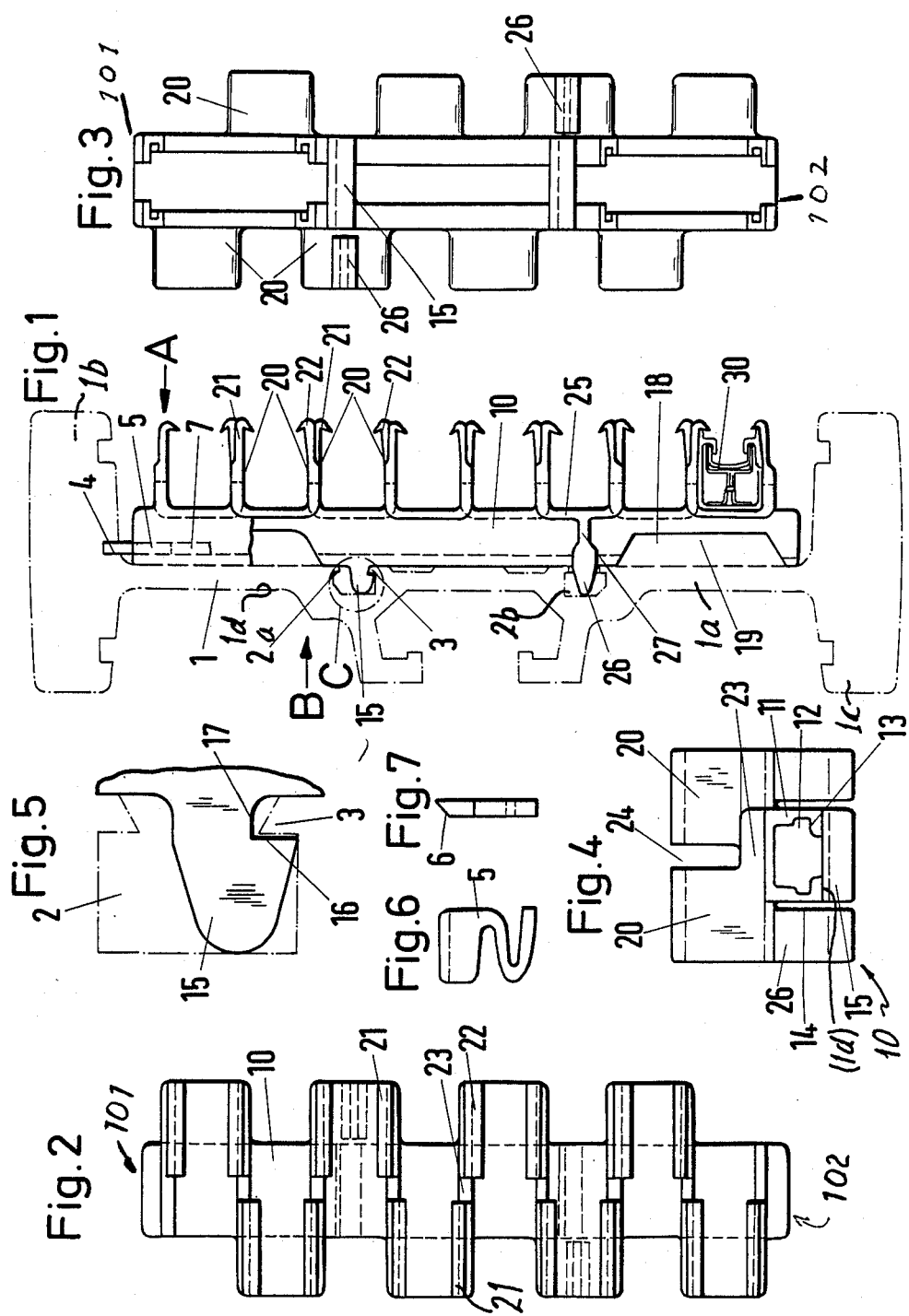

HOLDING OF CONDUCTORS

BACKGROUND OF THE INVENTION

The present invention relates to holding and fastening structure for connecting a plurality of conductors, bus bars, rails or the like to a carrier rail and particularly the invention relates to structure of this type that is used in overhung rail track systems under inclusion of holding structures in which clamps or claws are arranged in pairs facing each other and being constructed in a resiliently yielding fashion for gripping around and behind such a current conductor bus or bar with multiple claws or clamps being combined in a common holding structure.

Holding and fastening structures of the type to which the invention pertains generally are shown in German printed patent application No. 26 29 215 (see also U.S. Pat. No. 4,109,768). Herein pairs of clamps are disclosed which are arranged next to each other corresponding to the requirement for mounting current rails and bus bars in a juxtaposed relation. There is provided a certain distance in order to establish an escape space if the conductors or bars etc. are forced into the gripping and holding structure of the respective claws for purposes of fastening them. Owing to this yielding space it is apparent that for a given carrier rail structure there is a certain limitation on the number of current bus bars and conductors that can be connected to this carrying structure. Also fastening the holding structure to the carrier rail particularly for releasing them therefrom in case changes in the system are desired requires special tooling.

DESCRIPTION OF THE INVENTION

It is an object of the present invention to overcome the deficiences and to avoid the problems outlined above.

It is a specific object of the present invention to provide a new and improved holding, mounting and fastening structure for plural current bus bars, conductors and the like for purposes of connecting them to a carrier rail whereby pairs of holding clamps and claws are provided which yield resiliently in order to grip around and under the current bus bar to be fastened.

In accordance with the preferred embodiment of the present invention plural pairs of holding claws and clamps are arranged laterally displaced from a common holding bar, alternatingly extending towards one end and the opposite side whereby individual claws pertaining to juxtaposed claws for fastening different current bus bars or conductors are arranged on a common line but are separated from each other by a gap. This gap permits bending of all those claws arranged for holding the same current conductor independently from the claws holding a juxtaposed conductor. Thus, the holding bars for several conductors which have to be kept spaced apart with but a minimum distance, has the conductor claws arranged staggeredly, alternatingly laterally offset and extending from opposite sides with physical alignment of claws holding different conductors and spacing in the alignment to denote independent resilient deflection. Since the claws for adjacent conductors thus overlap without interference as to their individual clamping action, the conductors can be more closely spaced.

Preferably the claws of a pair extend from a tongue being arranged in the level of the holding bar and extending therefrom in a staggered relationship. This bar will have at least one particular suspending claw projecting into the appropriate groove of the carrier rail. This suspending claw has a point gripping behind a nose of that carrier bar groove. At least one resilient element should be provided on one of the bottoms of the several claws which also projects in to the suspension groove and urges the suspension claw resiliently against its support. Upon inserting or removing the holding bar with respect to the carrier rail this resilient element is slightly deformed. Alternatively the holding bar may be provided with a C-shaped slide-in groove for a particular clamping spring which bears against a pin and reaches just as the pin itsel into a clamping groove of the carrier bar.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a side elevation for a holding structure for multiple bus bars and conductors constructed in accordance with the preferred embodiment of the present invention for practicing the best mode thereof in conjunction with a carrier rail of overall double T-shaped configuration shown in dotted lines in the figure;

FIG. 2 illustrates the particular holding shown in FIG. 1 and from a direction indicated by arrow A in FIG. 1;

FIG. 3 is a view basically similar to FIG. 2 showing the requisite configuration in the direction of arrow B;

FIG. 4 is a end view of the holding structure in FIGS. 1-3;

FIG. 5 illustrates on a larger scale the detail C as indicated in FIG. 1;

FIG. 6 illustrates a clamping spring used in the alternative in the structure shown in FIG. 1; and FIG. 7 is a front view of the clamping spring shown in FIG. 6.

Proceeding to the detailed description of the drawings as was already mentioned a carrier beam or rail of I or double T configuration is indicated in dashed lines in FIG. 1. Basically this carrier rail has a rather long web 1a and two cross elements 1b and 1c. The web is provided with two suspending grooves 2a and 2b having in each instance holding noses 3 i.e. a longitudinal ridge overhanging the interior of the respective groove for ease of affixing the holder proper, 10, for the conductors, bus rails or the like. In this case conductors 30 are to be held from which electric current is extracted through sliding contacts of a vehicle. Rail 1 is made of metal; bar 10 is preferably made of glass fibre-reinforced polyamide. The bar 10 has one end 101 and another end 102.

Reference numeral 4 refers to a clamping groove in the upper cross element 1b which is, so to speak, an alternative connective features for a conductor holder. In this groove 4 one can insert a clamping spring 5, shown in details in FIGS. 6 and 7. This spring 5 has an oblique shoulder 6 for ease of insertion into the groove 4. The clamping spring 5 is of S-shaped configuration and made of an elastic synthetic material. The spring 5 is guided in a slide-in groove 12 of a holding bar 10. A pin 7 extends from holder 10 and the spring 5 bears against that pin. If this kind of clamping arrangement is used then the pin 7 will reach into a clamping groove of the transverse element 1c. This groove is not shown in the drawings.

As shown in greater detail in FIG. 4 the holding bar 10 itself is essentially of U-shaped cross section. The arms 11 of the U are provided with the slide-in grooves 12. Support ridges 13 extend from these legs 11 and bear against a support surface 1d of the web 1a of carrier rail 1. These ridges are wider than the thickness of the legs 11. These grooves 12 can be provided for instance for inserting metal rails for any purpose. Prior to inserting such rails (not shown) into grooves 12 one may slide screws into the rail having for example heads which are so wide as the distance between the flanges 11 so that upon tightening of respective nuts these screws are in effect locked and prevented by the legs 11 from rotation.

In the particular illustrated exaxmple the support ridges 13 are, so to speak, connected to each other at the end of the U-shaped area of the holding bar 10 under utilization of suspension claws 15. FIGS. 1–4 show these suspension claws and FIG. 5 illustrates them in greater detail and at a larger scale. These suspension claws 15 have claw peaks or noses 16 which are arranged to extend in down direction and by means of these noses, the claws actually grip under one of the holding noses 3 of the suspension grooves 2. This is also shown in FIG. 5.

The holding bar 10 is provided further with pairs 20 of holding claws of generally U-shaped configuration and extending particularly from the side of bar 10 facing away from the web 1a of carrier 1. The conductors 30 are held by these claw pairs 20. Only one of these conductors 30 is shown in FIG. 1, in the bottom part of the figure. A particular pair of holding claws 20 is established by an upper holding claw 21 and a lower claw 22 extending from a tongue 25. These claws each have peaks, noses or points directed towards each other. It should be noted that the terminology "above" and "below" is meaningful only in conjunction with a generally vertical arrangement of the carrier rail 1. There is no reason in principle that the entire arrangement should not be rotated by 90 degrees, meaning that there may be a generally horizontal arrangement of the bar 10 as far as its cross section is concerned and the juxatpositioning and spatial relationships between the various claws have to be transferred accordingly.

The claw pairs 20 pertaining to conductors arranged next to each other but those which are arranged one above each other are now arranged in a staggered relationship as shown in FIGS. 2 and 3. One can also say that tongues 25 extend away from the bar in the alternating relation as shown in FIGS. 2 and 3. The claws 21,22 extend from these tongues 25 transversely to the plane of the drawing in FIGS. 2 and 3. This staggered and lateral offset arrangement for the claws establishes that for two such conductors 30 one needs space along corresponding to the thickness of a single holding claw. That in turn means that by operation of this arrangement the particular rail can accomodate one more conductor than would be permissible otherwise in cases of a direct juxtapositioning of holding pairs in vertical direction.

There is accordingly in each instance an upper claw 21 on one side of the holding bar 10 extending from one tongue 25 for holding one conductor and there is a lower holding claw 22 on the other side extending from a different tongue and provided for holding another conductor, but such two claws pertaining to different pairs 20 are directly aligned transversely to the extension of bar 10, in the direction of extension of the conductors they hold. The foot portion of the holding bar 10 is a flat bar 23. Between the holding claws of one row an air gap 24 is provided through operation and spacing of claws 21 and 22 pertaining to different pairs 20 and to be effective between all pairs 20. This air gap 24 permits the various aligned claws 21 and 22 to be bent individually towards a conductor, prior to insertion to resiliently yield outwardly upon insertion of such a conductor 30 without interfering with the respective aligned claw.

The fact that the claw pairs 20 extend alternatingly laterally from the bar 10 has additional advantages. First of all one could consider the bar 10 as an assembly of integral tongues 25 with extensions such that a through-bar 23 obtains, and the legs 11 extend from that through-bar. In addition spring elements of drop like configuration, 26, extend from two of the tongues 25 in direction opposite the direction of extension of the claws 21,22. They leave a gap 14 between them and the arms 11 (see FIG. 4). As shown in FIG. 1 these springs 26 are used in addition or in the alternative for insertion into a groove of the rail 1, e.g., groove 2b.

Each spring 26 has its thickest part in the same level of the bottom 17 of a suspension claw (FIG. 5). As the bar 10 is inserted and fastened to rail 1, one has to lift-tilt the bar 10 a little so that claw points 16 can slide over the noses 3. Upon lifting bar 10, the spring 26 is urged with its upper side against the upper upper nose 3 of the groove 2b so that the spring 26 as a whole is deflected down. The spring 26 is always a little compressed when inserted in 2b so that the bar cannot easily be laterally stopped along the rail 1. The holding bar 10 does not abut the web 1a over its entire extension. Rather it is provided with a number of grooves, one of them, 18, being provided to establish a duct or a channel between the hold bar 10 and the web 1 which permits insertion of cable generally.

The invention is not limited to the embodiments described above, but all changes and modifications thereof, not constituting departures from the spirit and scope of the invention, are intended to be included.

We claim:

1. An arrangement for holding and fastening a plurality of conductors on a carrier rail closely spaced in relation to each other, a holding bar to be affixed and to be connected to the carrier rail, comprising:

fastening means projecting from the bar for fastening to the carrier rail, said fastening means including a resilient element and a claw element for insertion in separate grooves of the carrier rail such that the resilient element biases the claw element, said fastening means acting resiliently against a web of the carrier rail;

a plurality of holding claw pairs extending from said holding bar in a direction opposite a direction of extension of the fastening means, juxtaposed claw pairs for holding juxtaposed conductors, said claw pairs extending laterally from said holding bar with reference to a length extension of the holding bar and extending alternatingly in opposite lateral directions, each claw pair having a first claw positioned with respect to a second claw along said length extension twoard a first end of said holding bar and said second claw positioned with respect to said first claw toward a second end of said holding bar whereby a second claw from one of the pairs is in substantial alignment, transverse to the longitudinal extension of the holding bar, with a first claw of a juxtaposed one of the pairs;

a gap extending between said aligned holding claws, said gap pertaining to claws of pairs extending in opposite directions, there being a plurality of gaps accordingly said gaps being essentially aligned in the direction of length extension of the holding bar;

said claws being individually resilient owing to the gaps, each for yielding in the direction of said length extension of said holding bar, independently from yielding of the respective aligned claw; and each of said claws having a claw peak for gripping around an inserted conductor to be held by the respective claws of a pair.

2. The arrangement as in claim 1 wherein said holding claw pair is generally of U shaped configuration with two arms establishing the resilient claws of a pair.

3. A holding bar for conductors comprising a bar structure extending lengthwise in a particular direction and being provided with fastening means for fastening to a carrier rail;

a first set of spaced apart claw pairs extending from one side of the bar in a first lateral direction;

a second set of spaced apart claw pairs extending from the same side of the bar in a second lateral direction opposite to the first lateral direction, each claw pair haing a first claw arm positioned with respect to a second claw arm along said length toward a first end of said holding bar and said second claw arm positioned with respect to said first claw arm along said length toward a second end of said holding bar such that a second claw arm from a claw pair of the first set is substantially aligned with a first claw arm from a claw pair of the second set and a first claw arm from a claw pair of the first set is substantially aligned with a second claw pair arm from a claw pair of the second set;

said claw arms as aligned being separated by a gap.

4. A bar as in claim 3 said claw arms being resilient for deflection out of alignment.

* * * * *